(12) United States Patent
Tanaka et al.

(10) Patent No.: US 11,255,001 B2
(45) Date of Patent: Feb. 22, 2022

(54) ALUMINUM-ALLOY FOIL

(71) Applicant: UACJ CORPORATION, Tokyo (JP)

(72) Inventors: Yuichi Tanaka, Aichi (JP); Tetsuya Motoi, Aichi (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 16/081,669

(22) PCT Filed: Mar. 9, 2017

(86) PCT No.: PCT/JP2017/009450
§ 371 (c)(1),
(2) Date: Aug. 31, 2018

(87) PCT Pub. No.: WO2017/155027
PCT Pub. Date: Sep. 14, 2017

(65) Prior Publication Data
US 2019/0119790 A1    Apr. 25, 2019

(30) Foreign Application Priority Data

Mar. 11, 2016   (JP) ................................. 2016-048715

(51) Int. Cl.
| | |
|---|---|
| *C22C 22/00* | (2006.01) |
| *C22F 1/00* | (2006.01) |
| *C22F 1/04* | (2006.01) |
| *C22C 21/00* | (2006.01) |
| *B21B 1/40* | (2006.01) |
| *B21B 3/00* | (2006.01) |

(52) U.S. Cl.
CPC ................ *C22C 21/00* (2013.01); *B21B 1/40* (2013.01); *B21B 3/00* (2013.01); *B21B 2003/001* (2013.01); *C22F 1/04* (2013.01)

(58) Field of Classification Search
CPC ..... C22C 21/00; B21B 1/40; B21B 2003/001; B21B 3/00; C22F 1/04
See application file for complete search history.

(56) References Cited

U.S. PATENT DOCUMENTS

2014/0261908 A1*  9/2014  Seki ....................... H01G 11/68
148/551
2015/0203941 A1   7/2015  Seki et al.

FOREIGN PATENT DOCUMENTS

| | | | | |
|---|---|---|---|---|
| CN | 104769141 A | 7/2015 | | |
| CN | 104797725 A | 7/2015 | | |
| JP | 2012-21205 A | 2/2012 | | |
| JP | 2012021205 A | * | 2/2012 | ............ H01M 4/661 |
| JP | 2013-14837 A | 1/2013 | | |
| JP | 2014-40659 A | 3/2014 | | |
| JP | 2014-47367 A | 3/2014 | | |
| JP | 2014047367 A | * | 3/2014 | |
| JP | 2014109057 A | * | 6/2014 | ............ H01G 11/68 |
| KR | 2014-0030062 A | 3/2014 | | |
| KR | 10-1518142 B1 | 5/2015 | | |
| WO | 2012/169570 A1 | 12/2012 | | |
| WO | 2014/021170 A1 | 2/2014 | | |

OTHER PUBLICATIONS

May 30, 2017 Written Opinion issued in International Patent Application No. PCT/JP2017/009450.
May 30, 2017 International Search Report issued in International Patent Application No. PCT/JP2017/009450.
Jun. 4, 2020 Office Action issued in Chinese Patent Application No. 201780016730.2.
Nov. 10, 2020 Office Action issued in Japanese Patent Application No. 2018-504581.
Aug. 11, 2020 Office Action issued in Chinese Patent Application No. 201780016730.2.
Jan. 8, 2021 Notice of Decision of Refusal issued in Chinese Patent Application No. 201780016730.2.
Apr. 6, 2021 Decision of Refusal issued in Japanese Patent Application No. 2018-504581.
S. Yamamoto. "Fe atom behavior of Fe atom in Al—Fe alloy." Nihon Journal of the Japan Society of Metals, Japan Society of Metals, vol. 56, No. 7, 1992, pp. 757 to 763 (See the second page of the Translation of the Apr. 6, 2021 Decision of Refusal for the concise explanation of relevance of this reference).

* cited by examiner

*Primary Examiner* — Daniel J. Schleis
*Assistant Examiner* — Kevin Ct Li
(74) *Attorney, Agent, or Firm* — Oliff PLC

(57) ABSTRACT

An aluminum-alloy foil that enables to satisfy both of high elongation and high strength even in the case of reducing the foil thickness. The chemical composition of the aluminum-alloy foil contains, in mass %, Fe: 1.0% or more and 2.0% or less, Cu: 0.1% or more and 0.5% or less, and Mn: 0.05% or less, the remainder being Al and unavoidable impurities. The aluminum-alloy foil has a foil thickness of 20 μm or less, and satisfies the relation El≥100×t/UTS. Here, t represents a foil thickness (μm), UTS represents a tensile strength (MPa), and El represents an elongation (%).

9 Claims, No Drawings

ALUMINUM-ALLOY FOIL

TECHNICAL FIELD

The present invention relates to an aluminum-alloy foil.

BACKGROUND ART

Aluminum-alloy foils have been used as electrode current collectors for power storage devices, i.e., secondary batteries, electric double-layer capacitors, and lithium-ion capacitors—and the like. For example, in a lithium-ion secondary battery, the positive electrode is normally manufactured by applying a mixture slurry, which contains an electrode active material, onto a surface of an aluminum-alloy foil, which serves as a current collector, drying it, and applying compression using a press. Typically, the positive electrode thus manufactured is placed in a state of being stacked with a separator and a negative electrode or in a state in which they are rolled up as is in the stacked state, and housed in a case.

In recent years, for the purpose of improving a battery capacity, thinning of aluminum-alloy foils for use in current collectors has been demanded. Thinned aluminum-alloy foils require high strength in order to prevent the occurrence of breaks which is caused due to the reduction of tensile strength in the electrode manufacturing process.

Patent Document 1 precedently discloses an aluminum-alloy foil, which is obtained by subjecting an ingot which contains, in mass %, Mn: 0.10% to 1.50% or less and Fe: 0.20% to 1.50%, the total of Mn and Fe being 1.30% to 2.10%, and the remainder being Al and unavoidable impurities to homogenization treatment; subjecting the ingot to hot rolling, cold rolling, intermediate annealing, and cold rolling to form a raw material for the aluminum-alloy foil having a thickness of 5 to 25 μm with a rolling reduction of 95% or more at the time after the intermediate annealing, and subjecting the raw material to heat treatment at a temperature of 70° C. to 200° C. for 10 minutes or more.

In addition, Patent Document 2 discloses an aluminum-alloy foil containing, in mass %, Fe: 1.4% to 1.7% and Cu: 0.1% to 0.5%, wherein Si is restrained to be 0.4% or less, the remainder is Al and unavoidable impurities, the size of sub-grains is 0.8 μm or less in the thickness direction and 45 μm or less in the rolling direction.

PRIOR ART LITERATURE

Patent Documents

Patent Document 1 JP-A-2014-40659
Patent Document 2 JP-A-2014-47367

SUMMARY OF THE INVENTION

Problem(s) to be Solved by the Invention

However, previously-known techniques have a problem with respect to the following point. That is, aluminum-alloy foils generally show a decrease in elongation in accompany with increase of the strength and reduction of the foil thickness. Therefore, the thinned aluminum-alloy foils normally show a remarkable decrease in elongation. The aluminum-alloy foils with low elongation tend to break even having high strength. Thus, when the aluminum-alloy foils with low elongation are used in, for example, a positive current collector or the like in a lithium-ion secondary battery, the aluminum-alloy foils cannot follow deformation caused by expansion and contraction of an active material due to charge and discharge, and tend to break. In addition, the aluminum-alloy foils with low elongation tend to break also during the electrode manufacturing process.

Here, in Patent Document 2, elongation of the aluminum-alloy foils is improved by controlling the number of crystal grains and the solid solution state during intermediate annealing, and by reducing the size of sub-grains. However, the elongation of the aluminum-alloy foils with a foil thickness of 12 μm is 3.4% or less at a tensile strength of around 280 MPa, which cannot be considered to be satisfactorily high.

The present invention has been made in view of the above-mentioned background, and it is intended to provide an aluminum-alloy foil that enables to satisfy both of high elongation and high strength even in the case of reducing the foil thickness.

Means for Solving the Problems

One aspect of the present invention is an aluminum-alloy foil, wherein:

the chemical composition contains, in mass %, Fe: 1.0% or more and 2.0% or less, Cu: 0.1% or more and 0.5% or less, and Mn: 0.05% or less, the remainder being Al and unavoidable impurities;

a foil thickness is 20 μm or less, and the aluminum-alloy foil satisfies Formula 1 as expressed below:

$$El \geq 100 \times t/UTS \qquad \text{Formula 1}$$

wherein t represents the foil thickness (μm), UTS represents a tensile strength (MPa), and El represents elongation (%).

Effects of the Invention

The aluminum-alloy foil has the above-specified chemical composition and foil thickness, and satisfies Formula 1 as specified above. Accordingly, the aluminum-alloy foil enables to satisfy both of high elongation and high strength even in the case of reducing the foil thickness. In addition, the aluminum-alloy foil makes it possible to maintain the resistivity low. Consequently, when used as, for example, an electrode current collector of a power storage device, the aluminum-alloy foil tends not to break during the electrode manufacturing process or when battery charging and discharging is performed repeatedly, even if the foil thickness is thin. In addition, the aluminum-alloy foil is advantageous to achieve power storage devices with high energy efficiency because of its low resistivity.

MODES FOR CARRYING OUT THE INVENTION

Intentions and reasons for limitation of the chemical composition (the unit being represented by mass % and abbreviated simply to "%" in the following description of the chemical compositions) of the aluminum-alloy foil are as follows.

Fe: 1.0% or more and 2.0% or less

Fe is an element necessary to increase the strength of the aluminum-alloy foil and to form Al—Fe-based compounds for promoting restoration of the aluminum-alloy foil. These functions can be obtained by controlling both the solid solution amount of Fe and the precipitation state of Fe, and by controlling the introduction amount of processing strain in manufacturing the aluminum-alloy foil.

Fe that is present in a solid solution in the aluminum-alloy foil inhibits the migration of dislocations and prevents the strength of the aluminum-alloy foil from decreasing excessively. On the other hand, compounds precipitated as the Al—Fe-based compounds contribute to promote restoration of the worked structure during cold rolling by dispersing overall in a large number as compounds that are not matched with the Al matrix. During the cold rolling, the processing strain is introduced, and simultaneously the restoration of the worked structure slightly proceeds. Such mechanism is not clear in detail, but it can be considered that room to have the processing strain introduced is continuously produced by promoting the restoration due to existence of the Al—Fe-based compounds, so that high elongation is maintained even in the case of reducing the foil thickness.

If the Fe content becomes less than 1.0%, the distribution density of the Al—Fe-based compounds, which are not matched with the Al matrix (matrix), becomes low, and the restoration promoting effect in the aluminum-alloy foil becomes insufficient, so that high elongation cannot be obtained. On the other hand, if the Fe content exceeds 2.0%, coarse Al—Fe-based compounds that exceed several hundred micrometers are formed during casting, which leads to the occurrence of pinholes (perforations) during foil rolling, whereby the manufacture of a robust foil material becomes difficult. From the above-mentioned viewpoint, the Fe content can be set preferably to 1.1% or more and more preferably to 1.2% or more. In addition, the Fe content can be set preferably to 1.9% or less, more preferably to 1.8% or less, and yet more preferably to 1.7% or less.

Cu: 0.1% or more and 0.5% or less

Cu is an element that contributes to increasing the strength of aluminum-alloy foil. Addition of Cu does not influence on the increase of the resistivity so much in principle. Cu is of a nature to form a solid solution with Al—Fe-based compounds in part, and thus in the case of Al—Fe-based compounds with a relatively high Fe content as mentioned above, the increase of the resistivity in relation to the Cu content can be further prevented. The Cu content is set to 0.1% or more from the viewpoint of obtaining the strength-increasing effect of the additive. It is noted that the strength-increasing effect cannot be sufficiently obtained when the Cu content is less than 0.1%. On the other hands, if the Cu content exceeds 0.5%, rolling becomes difficult because the strength becomes excessively high. From this viewpoint, the Cu content can be set preferably to 0.12% or more and more preferably to 0.14% or more. In addition, the Cu content can be set preferably to 0.45% or less, more preferably to 0.4% or less, yet more preferably to 0.35% or less, and yet furthermore preferably to 0.3% or less from the viewpoint of the rolling stability during manufacture of the foil.

Mn: 0.05% or less

Mn is an element that contributes to increasing the strength of aluminum-alloy foil, and meanwhile it largely increases the resistivity. Therefore, if used as an electrode current collector, the energy efficiency is decreased, which is not preferable. For this reason, the Mn content is set to 0.05% or less. The Mn content is set preferably to 0.03% or less, and more preferably to 0.01% or less. It is noted that Mn is often contained in commonly used Al metals as an impurity. Consequently, to restrict the Mn content to less than 0.001%, it is necessary to use a high-purity base metal. Accordingly, from the viewpoint of cost savings, the Mn content can be set preferably to 0.001% or more.

The chemical composition can further contain, in mass %, Si: 0.01% or more and 0.6% or less. Intentions and reasons for limitation in this configuration are as follows.

Si: 0.01% or more and 0.6% or less

Si is an element that contributes to increasing the strength of aluminum-alloy foil. The Si content can be set to 0.01% or more from the viewpoint of obtaining the strength-increasing effect of the additive. It is noted that Si is often contained in commonly used Al metals as an impurity. Consequently, less than 0.01% of Si may be contained as an unavoidable impurity. Of course, to restrict the Si content to less than 0.01%, it is necessary to use a high-purity base metal. Accordingly, from the viewpoint of cost savings, the Si content can be set preferably to 0.01% or more, more preferably to 0.02% or more, and yet more preferably to 0.03% or more. On the other hands, if the content is made larger, Si forms coarse Si single-phase particles. In particular, if the Si content exceeds 0.6%, the coarse Si single-phase particles tend to be easily formed, and thus problems such as pinholes and foil tearing tend to occur at a foil thickness of 20 μm or less. Therefore, the Si content can be set preferably to 0.6% or less, more preferably to 0.5% or less, and yet more preferably to 0.4% or less.

The above-mentioned chemical composition may include elements such as Cr, Ni, Zn, Mg, B, V, and Zr as unavoidable impurities. It is noted that there is a risk that these elements will reduce elongation of the aluminum-alloy foil. Consequently, each of these elements is preferably restricted to 0.02% or less and the total amount of these elements is preferably restricted to 0.07% or less.

The foil thickness of the aluminum-alloy foil is 20 μm or less. If the foil thickness exceeds 20 μm, it cannot cope with thinning of the foil (down gauging of the foil thickness) that has been demanded in recent years. The aluminum-alloy foils have a foil thickness of 20 μm or less, and thus it is suitable in particular for use in an electrode current collector of power storage devices, for which thinning of the foil is highly demanded.

When the aluminum-alloy foil is used, for example, as a current collector, the foil thickness can be set preferably to 18 μm or less and more preferably to 15 μm or less from the viewpoint of further increasing the ratio of the active material to the volume of the entire battery with the aim of increasing battery capacity. It is noted that the lower limit of the foil thickness is not particularly limited, however, from the viewpoint of making it suitable for use as a current collector, the foil thickness can be set to 8 μm or more.

The aluminum-alloy foil satisfies Formula 1 as expressed below.

$$El \geq 100 \times t/UTS \qquad \text{Formula 1}$$

wherein t represents the foil thickness (μm), UTS represents a tensile strength (MPa), and El represents elongation (%). It is noted that the foil thickness t corresponds to the thickness after the final cold rolling. It is also noted that the unit of 100 in the right-hand side is MPa/μm.

In the case of a foil thickness of 20 μm or less, if the elongation El of the aluminum-alloy foil is below the value of 100×t/UTS, the aluminum-alloy foil cannot satisfy both of high elongation and high strength, and thus tends to brake. In the case where the aluminum-alloy foil that does not satisfy Formula 1 is used in, for example, a positive current collector in a lithium-ion secondary battery, and the like, the aluminum-alloy foils cannot follow deformation caused by expansion and contraction of an active material due to charge and discharge, and tends to brake. In contrast, the aluminum-alloy foil that satisfies Formula 1 enables to satisfy both of high elongation and high strength even if the foil thickness is thinned to 20 μm or less because the restoration during the cold rolling is promoted. It is noted that each of the tensile strength and elongation is a value that is measured in accordance with JIS Z2241.

The aluminum-alloy foil preferably further satisfies Formula 2 as expressed below.

$$\rho \leq 0.002 \times UTS + 0.006 \qquad \text{Formula 2}$$

wherein ρ represents a resistivity (μΩ·cm), and UTS represents a tensile strength (MPa). It is noted that ρ corresponds to the resistivity after the final cold rolling. It is also noted that the unit of 0.002 in the right-hand side of Formula 2 is μΩ·cm/MPa and the unit of 0.006 is μΩ·cm.

The resistivity is a physical property value related to the solid solution amount of the elements contained in the aluminum-alloy foil, and it increases along with increasing the solid solution amount for the purpose of increasing the strength. In the aluminum-alloy foil, Cu is mainly used as an element for increasing the strength, and thus the resistivity is maintained low. Accordingly, the aluminum-alloy foil is excellent in conductivity. Consequently, when the aluminum-alloy foil is used in a current collector of a power storage device, problems such as reduction of the energy efficiency tend not to occur in charging/discharging at high current. It is noted that the resistivity is a value that is measured by Double Bridge Method in accordance with JIS H0505. The resistivity is measured in liquid nitrogen in order to eliminate the influence of the atmospheric temperature.

The tensile strength of the aluminum-alloy foil is preferably 250 MPa or more. If the tensile strength is less than 250 MPa, the aluminum-alloy foil lacks sufficient strength, and thus may break in some cases. The tensile strength is more preferably 265 MPa or more, and yet more preferably 280 MPa or more.

The aluminum-alloy foil can be suitably used as a current collector in power storage devices, for example: a secondary battery such as a lithium-ion secondary battery; an electric double-layer capacitor; a lithium-ion capacitor; and the like. More specifically, for example, if the aluminum-alloy foil is used as a current collector of a lithium-ion secondary battery, a mixture that mainly contains an electrode active material is applied onto the surface of the aluminum-alloy foil serving as the current collector. Specifically, a mixture slurry that contains the electrode active material is applied onto the surface of the aluminum-alloy foil and dried, after which a press process is performed with the aims of compacting the mixture layer and increasing adhesion to the current collector. Even if the foil thickness is thin, the aluminum-alloy foil tends not to break during the electrode manufacturing process or when used in the battery, and is useful to achieve a power storage device with high energy efficiency because of its low resistivity.

The aluminum-alloy foil can be manufactured, for example, in the following way. That is, the aluminum-alloy foil can be obtained by hot rolling an aluminum-alloy ingot having the above-specified chemical composition without performing a homogenization treatment and then subjecting to cold rolling including foil rolling.

In the aluminum-alloy-foil manufacturing method, hot rolling can be performed at a temperature of 350° C. or less. Here, the temperature during hot rolling is set to 350° C. or less at the start and the end of hot rolling at which temperature measurement is easy to perform. The performance of hot rolling at a temperature of 350° C. or less enables to prevent occurrence of recrystallization and to accumulate processing strain during hot rolling. As a factor for promoting the restoration during cold rolling, the accumulation degree of the processing strain other than presence of Al—Fe-based compounds is involved. As the processing strain is accumulated more, dislocation is easier to thereby promote the restoration. The lower limit value of the temperature during hot rolling is not particularly limited, but can be set to 150° C. from the viewpoint of preventing an increased load on the rolling mill owing to the increased resistance to deformation.

In addition, the hold time after the hot-rolling start temperature is reached is not particularly limited, but can be set to 12 hours or less from the viewpoint of easily inhibiting the precipitation of Al—Fe—Si-based compounds. It is noted that hot rolling may be performed one time or may be divided up into multiple times, such as by performing a finish rolling after a rough rolling.

According to the aluminum-alloy-foil manufacturing method, an aluminum-alloy foil is obtained by performing cold rolling after hot rolling. At this time, annealing is not performed in the course of the cold rolling. The reason is that the performance of the midstream annealing releases work strain, restoration tends not to occur during the cold rolling, which lead to reduction in elongation of the aluminum-alloy-foil with the final foil thickness. It is noted that a final annealing after the conclusion of the cold rolling releases work strain to thereby cause reduction in the strength of the aluminum-alloy-foil. For this reason, the final annealing is preferably not performed after the conclusion of the cold rolling.

The foil thickness after the cold rolling is set to 20 μm or less as mentioned above. The foil thickness can be set preferably to 18 μm or less and more preferably to 15 μm or less. It is noted that the lower limit of the foil thickness is not particularly limited and can be set to 8 μm or more from the viewpoint of making it suitable for use as a current collector. It is noted that cold rolling can be performed one time or multiple times. The final rolling ratio of the cold rolling is preferably 98% or more and more preferably 99% or more from the viewpoint of promoting the restoration. It is noted that the final rolling ratio is a value that is calculated by 100× (the sheet thickness of the hot-rolled sheet before cold rolling–the foil thickness of the aluminum-alloy foil after the final cold rolling)/(the sheet thickness of the hot-rolled sheet before cold rolling).

It is noted that each of the configurations described above can be arbitrarily combined as needed to obtain the functions and effects described above.

Working Examples

Aluminum-alloy foils according to working examples are explained below.

Working Example 1

Aluminum-alloy ingots were prepared by manufacturing ingots each having a thickness of 480 mm, by a semicontinuous-casting method, of aluminum alloys having the chemical compositions shown in Table 1 and then surface milling the ingots. It is noted that, of the aluminum alloys having the chemical compositions shown in Table 1, alloys A-M are aluminum alloys having chemical compositions suited to the working examples, and alloys N—S are aluminum alloys having chemical compositions for comparative examples.

TABLE 1

| Alloy | Chemical Composition (mass %) | | | | |
|---|---|---|---|---|---|
| | Fe | Cu | Mn | Si | Al |
| A | 1.4 | 0.25 | 0.003 | 0.04 | bal. |
| B | 1.5 | 0.10 | 0.001 | 0.05 | bal. |
| C | 1.2 | 0.20 | 0.008 | 0.03 | bal. |
| D | 1.7 | 0.29 | 0.003 | 0.05 | bal. |
| E | 1.4 | 0.42 | 0.005 | 0.02 | bal. |
| F | 1.6 | 0.48 | 0.004 | 0.03 | bal. |
| G | 1.4 | 0.12 | 0.001 | 0.26 | bal. |
| H | 1.3 | 0.20 | 0.006 | 0.28 | bal. |
| I | 1.3 | 0.25 | 0.009 | 0.34 | bal. |
| J | 1.5 | 0.29 | 0.005 | 0.59 | bal. |
| K | 1.0 | 0.26 | 0.007 | 0.04 | bal. |
| L | 1.8 | 0.13 | 0.003 | 0.04 | bal. |
| M | 1.0 | 0.49 | 0.043 | 0.01 | bal. |
| N | 1.5 | 0.19 | 0.009 | 0.62 | bal. |
| O | 0.6 | 0.15 | 0.002 | 0.10 | bal. |
| P | 2.2 | 0.30 | 0.002 | 0.04 | bal. |
| Q | 1.4 | 0.07 | 0.004 | 0.04 | bal. |
| R | 1.4 | 0.61 | 0.006 | 0.04 | bal. |
| S | 1.4 | 0.35 | 0.062 | 0.02 | bal. |

The prepared aluminum-alloy ingots were hot rolled, without undergoing a homogenization treatment, to obtain hot-rolled sheets having a thickness of 5.0 mm. At this time, hot rolling was performed by performing rough rolling and then finish rolling successively. In addition, in the hot rolling, the start temperature of the rough rolling (the start temperature of the hot rolling) was set to 350° C. by heating the aluminum-alloy ingot, prior to being fed to the rough rolling, to 350° C. and holding it for 6 hours. In addition, the end temperature of the rough rolling (the intermediate temperature of the hot rolling) was set to 320° C., and the end temperature of the finish rolling (the end temperature of the hot rolling) was set to 180° C. In the present example as such, not only were the start temperature and the end temperature of the hot rolling set to 350° C. or less but also the end temperature of the rough rolling—which is a midstream temperature of the hot rolling, that is, the start temperature of the finish rolling—was set to 350° C. or less.

Subsequently, cold rolling was performed repetitively without performing midstream annealing, and thereby aluminum-alloy foils having a foil thickness: t (μm) of 8 to 20 μm were obtained. It is noted that the final rolling ratio of the cold rolling was obtained from 100 (5.0 mm sheet thickness of the hot-rolled sheet before cold rolling-foil thickness (mm) of the aluminum-alloy foil after the final cold rolling)/ (5.0 mm sheet thickness of the hot-rolled sheet before cold rolling).

Next, the resulting aluminum-alloy foils were used as samples, and the tensile strengths: UTS (MPa), the elongations: El (%), and the resistivities: ρ (μΩ·cm) were measured. Specifically, tensile strength and elongation were measured by extracting a JIS No. 5 test piece from the sample in accordance with JIS Z2241. And, it was confirmed whether the following Formula 1 is satisfied.

$$El \geq 100 \times t/UTS \qquad \text{Formula 1}$$

The resistivities: ρ were measured by Double Bridge Method in accordance with JIS H0505. It is noted that the resistivities: ρ were measured in liquid nitrogen in order to eliminate the influence of the atmospheric temperature. And, it was confirmed whether the following Formula 2 is satisfied.

$$\rho \leq 0.002 \times UTS + 0.006 \qquad \text{Formula 2}$$

Further, in order to examine the foil-rolling state, the rear surface of each sample was illuminated and the presence or absence of pinholes was also examined based on the presence/absence of light leakage.

These results were summarized and are shown in Table 2. It is noted that samples E1-E13 are working examples and samples C1-C6 are comparative examples. Here, sample C5 used an alloy R the Cu content of which exceeds 0.5%, and thus the strength was excessively high, so that an evaluatable aluminum-alloy foil with a foil thickness of 20 μm or less could not be obtained. Therefore, the tensile strength and elongation could not be measured.

TABLE 2

| Sample | Alloy | Foil Thickness: t (μm) | Tensile Strength: UTS (MPa) | Elongation: El (%) | Resistivity: ρ (μΩ · cm) | Rollability | Pinholes | 100 × t/UTS (%) | Formula 1 | 0.002 × UTS + 0.006 (μΩ · cm) | Formula 2 |
|---|---|---|---|---|---|---|---|---|---|---|---|
| E1 | A | 12 | 302 | 5.2 | 0.55 | Good | Absent | 4.0 | Satisfied | 0.61 | Satisfied |
| E2 | B | 8 | 250 | 4.0 | 0.51 | Good | Absent | 3.2 | Satisfied | 0.51 | Satisfied |
| E3 | C | 15 | 288 | 7.2 | 0.54 | Good | Absent | 5.2 | Satisfied | 0.58 | Satisfied |
| E4 | D | 18 | 312 | 6.3 | 0.55 | Good | Absent | 5.8 | Satisfied | 0.63 | Satisfied |
| E5 | E | 12 | 336 | 3.9 | 0.58 | Good | Absent | 3.6 | Satisfied | 0.68 | Satisfied |
| E6 | F | 20 | 345 | 6.0 | 0.60 | Good | Absent | 5.8 | Satisfied | 0.70 | Satisfied |
| E7 | G | 12 | 258 | 7.4 | 0.52 | Good | Absent | 4.7 | Satisfied | 0.52 | Satisfied |
| E8 | H | 12 | 287 | 5.7 | 0.56 | Good | Absent | 4.2 | Satisfied | 0.58 | Satisfied |
| E9 | I | 12 | 301 | 5.1 | 0.58 | Good | Absent | 4.0 | Satisfied | 0.61 | Satisfied |
| E10 | J | 12 | 311 | 4.7 | 0.61 | Good | Absent | 3.9 | Satisfied | 0.63 | Satisfied |
| E11 | K | 12 | 304 | 5.0 | 0.53 | Good | Absent | 4.0 | Satisfied | 0.61 | Satisfied |
| E12 | L | 12 | 262 | 7.1 | 0.53 | Good | Absent | 4.6 | Satisfied | 0.53 | Satisfied |
| E13 | M | 12 | 347 | 3.6 | 0.68 | Good | Absent | 3.5 | Satisfied | 0.70 | Satisfied |
| C1 | N | 12 | 286 | 5.9 | 0.57 | Good | Present | 4.2 | Satisfied | 0.58 | Satisfied |
| C2 | O | 15 | 301 | 2.8 | 0.60 | Good | Absent | 5.0 | Not Satisfied | 0.61 | Satisfied |
| C3 | P | 12 | 313 | 5.4 | 0.59 | Good | Present | 3.8 | Satisfied | 0.63 | Satisfied |
| C4 | Q | 12 | 232 | 9.5 | 0.51 | Good | Absent | 5.2 | Satisfied | 0.47 | Not Satisfied |
| C5 | R | — | — | — | — | Bad | — | — | — | — | — |
| C6 | S | 12 | 323 | 4.3 | 0.74 | Good | Absent | 3.7 | Satisfied | 0.65 | Not Satisfied |

As shown in Table 2, because sample C1 used alloy N, in which the Si content was more than 0.6%, coarse Si single-phase particles were formed and pinholes caused thereby were created.

Because sample C2 used alloy O, in which the Fe content was below 1.0%, there were few dispersed Al—Fe-based compounds, and thus the restoration was not promoted during cold rolling, and elongation was low. Consequently, sample C2 did not satisfy the relation of Formula 1.

Because sample C3 used alloy P, in which the Fe content was more than 2.0%, coarse compounds were formed during casting and pinholes were created during foil rolling.

Because sample C4 used alloy Q, in which the Cu content was below 0.1%, work-hardening is difficult, and thus the tensile strength was below 250 MPa. It is noted that the tensile strength of C4 showed the lowest value in comparison with the other samples.

Because sample C6 used alloy S, in which the Mn content was more than 0.05%, the resistivity was high.

In contrast with these samples, each of samples E1-E13 has the chemical composition and foil thickness as mentioned above, and satisfies Formula 1 specified above. Consequently, in samples E1-E13, it was confirmed that both of high elongation and high strength were satisfied even in the case where a foil thickness is made as thin as 20 μm or less. In addition, samples E1-E13 satisfy Formula 2 as rized and are shown in Table 4. It is noted that samples E14-E17 are working examples and samples C7-C9 are comparative examples.

TABLE 3

| | | Hot Rolling | | |
|---|---|---|---|---|
| Condition | Homogenization Treatment | Start Temp. (° C.) | End Temp. (° C.) | Midstream Annealing |
| 1 | Not Performed | 250 | 206 | Not Performed |
| 2 | Not Performed | 300 | 235 | Not Performed |
| 3 | 520° C. × 6 h | 350 | 282 | Not Performed |
| 4 | Not Performed | 350 | 263 | Not Performed |
| 5 | Not Performed | 400 | 318 | Not Performed |
| 6 | Not Performed | 500 | 366 | Not Performed |
| 7 | Not Performed | 350 | 271 | Annealing at 380° C. when thickness was 1 mm |

TABLE 4

Aluminum-Alloy Foil Properties

| Sample | Condition | Foil Thickness: t (μm) | Tensile Strength: UTS (MPa) | Elongation: El (%) | Resistivity: ρ (μΩ · cm) | Pinholes | 100 × t/UTS (%) | Formula 1 | 0.002 × UTS + 0.006 (μΩ · cm) | Formula 2 |
|---|---|---|---|---|---|---|---|---|---|---|
| E14 | 1 | 12 | 312 | 4.2 | 0.58 | Absent | 3.8 | Satisfied | 0.63 | Satisfied |
| E15 | 2 | 12 | 307 | 4.7 | 0.57 | Absent | 3.9 | Satisfied | 0.62 | Satisfied |
| E17 | 4 | 12 | 301 | 5.1 | 0.55 | Absent | 4.0 | Satisfied | 0.61 | Satisfied |
| C7 | 5 | 12 | 298 | 3.9 | 0.53 | Absent | 4.0 | Not Satisfied | 0.60 | Satisfied |
| C8 | 6 | 12 | 295 | 3.7 | 0.51 | Absent | 4.1 | Not Satisfied | 0.60 | Satisfied |
| C9 | 7 | 12 | 296 | 3.4 | 0.53 | Absent | 4.1 | Not Satisfied | 0.60 | Satisfied | specified above. Consequently, it was also confirmed, in addition to the above, that samples E1-E13 can maintain the resistivity low.

Working Example 2

The present example principally examined the effects of the temperature conditions during hot rolling, the presence/absence of homogenization treatment, and midstream annealing during cold rolling, and the like.

An aluminum-alloy ingot was prepared by manufacturing ingots each having a thickness of 480 mm, by a semicontinuous-casting method, of aluminum alloy A having the chemical composition shown in Table 1 and then surface milling the ingot.

Using aluminum-alloy ingot A, aluminum-alloy foils having a foil thickness of 12 μm were manufactured according to the manufacturing conditions shown in Table 3. In the resulting aluminum-alloy foils, the tensile strengths, the elongations, the resistivities, and the foil-rolling states (presence/absence of pinholes) were examined in the same way as in the Working Example 1. These results were summa- As shown in Table 4, in samples C7 and C8, the hot-rolling start temperature during hot rolling was more than 350° C. Accordingly, in samples C7 and C8, the accumulation of processing strain during hot rolling was less, and thus the restoration during cold rolling was made insufficient, and elongation was low. Consequently, samples C7 and C8 did not satisfy the relation of Formula 1.

Sample C9 was manufactured by starting hot rolling at a temperature of not exceeding 350° C., and performing a midstream annealing at the time of having a sheet thickness of 1 mm in the course of cold rolling at a high temperature of 380° C. exceeding 350° C. Accordingly, in sample C9, work strain was released by the midstream annealing, and thereby the restoration during the cold rolling was made insufficient, and elongation was low. Consequently sample C9 did not satisfy the relation of Formula 1.

In contrast with these samples, each of samples E14-E17 has the chemical composition and foil thickness as described above, and satisfies Formula 1 specified above. Consequently, in samples E14-E17, it was confirmed that both of high elongation and high strength were satisfied even in the case where a foil thickness is made as thin as 20 μm or less. In addition, samples E14-E17 also satisfy Formula 2 as specified above. Consequently, it was also confirmed, in addition to the above, that samples E14-E17 can maintain the resistivity low.

The above explained the details of the working examples of the present invention, but the present invention is not limited to the above-mentioned working examples, and various modifications can be effected within a range that does not depart from the gist of the present invention.

The invention claimed is:

1. An aluminum-alloy foil, wherein:
the chemical composition consisting of, in mass %, Fe: 1.1% or more and 1.3% or less, Cu: 0.1% or more and 0.5% or less, and Mn: 0.05% or less, the remainder being Al and unavoidable impurities;
a foil thickness is 20 μm or less, and
the aluminum-alloy foil satisfies Formula 1 expressed as below:

$$El > 100 \times t/UTS \quad \text{Formula 1}$$

wherein t represents the foil thickness in μm, UTS represents a tensile strength in MPa, and El represents an elongation in %.

2. An aluminum-alloy foil, wherein:
the chemical composition consisting of, in mass %, Fe: 1.3% or more and 2.0% or less, Cu: 0.1% or more and 0.5% or less, and Mn: 0.05% or less, the remainder being Al and unavoidable impurities;
a foil thickness is 20 μm or less,
the aluminum-alloy foil satisfies Formula 1 expressed as below:

$$El > 100 \times t/UTS \quad \text{Formula 1}$$

wherein t represents the foil thickness in μm, UTS represents a tensile strength in MPa, and El represents an elongation in %, and
the aluminum-alloy foil satisfies Formula 2 expressed as below:

$$\rho \leq 0.002 \times UTS + 0.006 \quad \text{Formula 2}$$

wherein ρ represents a resistivity in μΩ·cm measured in liquid nitrogen by Double Bridge Method in accordance with JIS H0505, and UTS represents a tensile strength in MPa.

3. The aluminum-alloy foil according to claim 1, wherein:
the aluminum-alloy foil further satisfies Formula 2 expressed as below:

$$\rho \leq 0.002 \times UTS + 0.006 \quad \text{Formula 2}$$

wherein ρ represents a resistivity in μΩ·cm measured in liquid nitrogen by Double Bridge Method in accordance with JIS H0505, and UTS represents a tensile strength in MPa.

4. The aluminum-alloy foil according to claim 1, wherein: the tensile strength is 250 MPa or more.

5. The aluminum-alloy foil according to claim 2, wherein: the tensile strength is 250 MPa or more.

6. The aluminum-alloy foil according to claim 3, wherein: the tensile strength is 250 MPa or more.

7. The aluminum-alloy foil according to claim 1, wherein the aluminum-alloy foil is for a current collector.

8. The aluminum-alloy foil according to claim 2, wherein the aluminum-alloy foil is for a current collector.

9. The aluminum-alloy foil according to claim 3, wherein the aluminum-alloy foil is for a current collector.

* * * * *